(12) United States Patent
Schlummer

(10) Patent No.: US 11,300,982 B2
(45) Date of Patent: Apr. 12, 2022

(54) SYSTEM AND METHOD FOR THE METERING OF A LIQUID OR GASEOUS MEDIUM

(71) Applicant: Promix Solutions AG, Winterthur (CH)

(72) Inventor: Christian Schlummer, Winterthur (CH)

(73) Assignee: PROMIX SOLUTIONS AG, Winterthur (CH)

( * ) Notice: Subject to any disclaimer, the term of this patent is extended or adjusted under 35 U.S.C. 154(b) by 0 days.

(21) Appl. No.: 17/141,177

(22) Filed: Jan. 4, 2021

(65) Prior Publication Data
US 2021/0216087 A1 Jul. 15, 2021

(30) Foreign Application Priority Data

Jan. 13, 2020 (EP) .................................... 20151555

(51) Int. Cl.
*G05D 7/06* (2006.01)
*F04B 49/06* (2006.01)
*G01F 22/02* (2006.01)
*G01F 1/76* (2006.01)

(52) U.S. Cl.
CPC .......... *G05D 7/0623* (2013.01); *F04B 49/065* (2013.01); *G01F 1/76* (2013.01); *G01F 22/02* (2013.01); *G05D 7/0635* (2013.01)

(58) Field of Classification Search
CPC .......... Y10T 137/776; Y10T 137/7761; G05D 7/0623; G05D 7/0647; F04B 49/065; G01F 1/76
USPC .............................................. 137/487, 487.5
See application file for complete search history.

(56) References Cited

U.S. PATENT DOCUMENTS

| | | | | |
|---|---|---|---|---|
| 4,718,443 A * | 1/1988 | Adney | ...................... | G01F 3/36 137/486 |
| 5,303,731 A * | 4/1994 | Vavra | ........................ | G01F 1/50 137/468 |
| 5,396,923 A * | 3/1995 | Allen | ..................... | F16L 55/045 137/487.5 |
| 5,865,205 A * | 2/1999 | Wilmer | ................ | G05D 7/0635 137/2 |
| 6,152,162 A * | 11/2000 | Balazy | ................. | G05D 7/0635 137/110 |
| 6,363,958 B1 * | 4/2002 | Ollivier | .............. | G05D 16/0661 137/2 |
| 2003/0098069 A1 * | 5/2003 | Sund | ..................... | G01F 1/8413 137/487.5 |
| 2003/0192609 A1 * | 10/2003 | Enerson | .................... | F17C 5/06 137/899 |

(Continued)

FOREIGN PATENT DOCUMENTS

| | | |
|---|---|---|
| DE | 19613142 A1 | 10/1996 |
| DE | 102012009193 A1 | 11/2013 |
| EP | 0486957 A1 | 5/1992 |

OTHER PUBLICATIONS

European Search Report from Application No. EP20151555 dated Jun. 9, 2020, 2 pages.

*Primary Examiner* — William M McCalister
(74) *Attorney, Agent, or Firm* — Hard IP LLC

(57) ABSTRACT

A system for metering a liquid or gaseous medium comprises a pressure control valve and a flow sensor, the pressure control valve and the flow sensor forming a closed control circuit. The required metering quantity can be adjusted by controlling the metering pressure by means of the pressure control valve.

18 Claims, 4 Drawing Sheets

(56) References Cited

U.S. PATENT DOCUMENTS

| | | | | |
|---|---|---|---|---|
| 2006/0037644 A1* | 2/2006 | Nishikawa | ............ | G05D 7/0647 |
| | | | | 137/487.5 |
| 2006/0278276 A1* | 12/2006 | Tanaka | ...................... | G01F 5/00 |
| | | | | 137/487.5 |
| 2008/0023662 A1* | 1/2008 | Reinicke | ............... | F16K 15/183 |
| | | | | 251/58 |
| 2008/0140260 A1* | 6/2008 | Ding | ..................... | G01F 15/005 |
| | | | | 700/282 |
| 2009/0183548 A1* | 7/2009 | Monkowski | ........ | G01F 25/0038 |
| | | | | 73/1.35 |
| 2009/0317316 A1* | 12/2009 | McLauchlan | ........... | C01B 17/04 |
| | | | | 423/243.08 |
| 2011/0108126 A1* | 5/2011 | Monkowski | .......... | F16K 31/004 |
| | | | | 137/12 |
| 2012/0298220 A1* | 11/2012 | Hidaka | ................ | G05D 7/0635 |
| | | | | 137/468 |
| 2013/0092256 A1* | 4/2013 | Yasuda | ................ | G05D 7/0635 |
| | | | | 137/487 |
| 2013/0186486 A1* | 7/2013 | Ding | .................... | G05D 7/0635 |
| | | | | 137/487 |
| 2013/0255793 A1* | 10/2013 | Watanabe | ................. | F17D 3/00 |
| | | | | 137/14 |
| 2013/0269795 A1* | 10/2013 | Yasuda | ................ | G05D 7/0635 |
| | | | | 137/488 |
| 2014/0182692 A1* | 7/2014 | Hirata | ................. | G05D 7/0617 |
| | | | | 137/10 |
| 2015/0068440 A1* | 3/2015 | Minnock | ................. | E21B 34/04 |
| | | | | 114/312 |
| 2015/0211510 A1* | 7/2015 | Walsh | ................. | G05D 7/0629 |
| | | | | 137/487.5 |
| 2017/0293309 A1* | 10/2017 | Kishine | ................ | G05D 7/0635 |
| 2019/0354120 A1* | 11/2019 | Takijiri | ................ | F16K 17/025 |

\* cited by examiner

SYSTEM AND METHOD FOR THE METERING OF A LIQUID OR GASEOUS MEDIUM

CROSS-REFERENCE TO RELATED APPLICATIONS

This application claims the benefit of European patent application no. EP 20151555.8, filed Jan. 13, 2020, the contents of which is incorporated herein by reference in its entirety.

TECHNICAL FIELD

The present invention relates to a system and a method for metering a liquid or gaseous medium. The liquid or gaseous media are, in particular, low-viscosity fluids or gases, such as butane, pentane, $CO_2$, ethanol, methanol, nitrogen, argon.

DESCRIPTION OF RELATED ART

In conventional metering systems for low-viscosity liquids, a pump is often used that is operated according to the displacement principle, for example a piston pump or a diaphragm pump. The metering volume, i.e. the delivery rate per piston stroke, depends on the pump rotational speed and the volume of the piston chamber or the diaphragm chamber. Control valves are required to operate these pumps, for example check valves that ensure that the medium is sucked in or is pumped. These pumps are configured for a limited flow range, which is limited by the maximum pump rotational speed and the volume of the piston or diaphragm chamber. If only small metering volumes are to be pumped with a piston or diaphragm pump, that is to say that the pumped quantity is in the lower metering quantity range, the metering volume is very small compared to the volume of the piston chamber. In the lower metering quantity range, the delivery rate can therefore no longer be precisely controlled since the pistons or membranes are of a very large size in relation to the metering volume. A pulsating flow is therefore generated in the lower metering quantity range. In addition, such metering systems are prone to malfunctions resulting from the control valves.

Needle valves can also be used for the metering of low-viscosity liquids and gases, by means of which a metering quantity can be set depending on the needle position, e.g. according to EP 0 486 957 A1. In a closed loop control circuit, a mass flow sensor can be used to control a defined metering quantity via an adjustable throttle function. In such needle valves, the metering quantity is dependent on the needle position in the valve seat and the pressure difference across the metering valve, so that metering quantity fluctuations can occur if the pressure upstream of the needle valve or downstream of the needle valve is not constant. This pressure difference is therefore the pressure difference between the pre-pressure (p1) and the metering pressure (p2). In addition, the adjustable metering quantity can be varied to a very limited extent even with a given pressure difference due to the needle position, so that a needle valve is often only used with a maximum metering quantity range that is in the range from 1:10 to 1:20. For a metering quantity range of 1:10, the minimum metering quantity corresponds to $1/10$ of the maximum metering quantity. For a metering quantity range of 1:20, the minimum metering quantity corresponds to $1/20$ of the maximum metering quantity. With large pressure differences, the required small metering quantities lead to pulsating metering behavior. In the case of small pressure differences, large metering quantities can no longer be adjusted, since even with the needle fully raised, the pressure difference is not sufficient to adjust the metering quantity exactly. Consequently, only very limited metering quantity ranges can be covered with known metering devices.

BRIEF SUMMARY OF THE INVENTION

The object of the invention is to create a system and a method for metering a liquid or gaseous medium which have a large metering quantity spectrum, i.e. covers a large metering quantity range and delivers constantly and reliably via the valve regardless of the pressure difference between the pre-pressure (p1) and the metering pressure (p2).

If the term "for example" is used in the following description, this term relates to exemplary embodiments and/or variants, which is not necessarily to be understood as a more preferred application of the teaching of the invention. The terms "preferably", "preferred" are to be understood in a similar manner by referring to an example from a set of exemplary embodiments and/or variants, which is not necessarily to be understood as a preferred application of the teaching of the invention. Accordingly, the terms "for example", "preferably" or "preferred" can relate to a plurality of exemplary embodiments and/or variants.

The following detailed description contains various exemplary embodiments for the system according to the invention and the corresponding method. The description of a particular system is to be regarded as exemplary only. In the description and claims, the terms "contain", "comprise", "have" are interpreted as "including, but not limited to".

A system for metering a liquid or gaseous medium into a fluid stream which flows through a closed channel and has a process pressure (p3) comprises a feed line for the liquid or gaseous medium. The feed line is in fluid-conducting connection with the closed channel. A pressure control valve and a flow sensor are arranged in the feed line. The pressure control valve and the flow sensor are configured as a closed loop control circuit. A measured flow value can be generated by the flow sensor. The measured flow value can be fed to a controller as an input value. An output value is attributable to the input value by the controller, wherein the output value corresponds to a desired metering pressure. The desired metering pressure is adjustable by the pressure control valve, wherein a metering quantity is determined by the pressure difference between the metering pressure (p2) and the process pressure (p3). Thus, the metering quantity in the system according to the invention is controlled exclusively by setting the metering pressure (p2). The process pressure (p3) is constant or is set to a constant value by an upstream valve.

According to an embodiment, the flow sensor is configured as a mass flow sensor. According to an embodiment, the controller is configured as a mass flow controller. According to an embodiment, the flow sensor and the mass flow controller can form a unit.

The flow sensor is arranged upstream of the pressure control valve in the feed line. According to an embodiment, a pressure relief valve is arranged upstream of the flow sensor. By means of this pressure relief valve, pressure fluctuations caused by the compressor can be reduced to a constant value. The compressor can fill a pressure accumulator discontinuously.

According to an embodiment, the pressure control valve is configured as an electromagnetic valve. The pressure control valve can thus control the metering pressure based on an analog input signal. The analog input signal can include an electrical voltage as an example. In particular, the electrical voltage can amount to up to 10 V. The range of 0 to 10 V can correspond, for example, to a pressure range of 0 to 400 bar. This means that an input signal of 10 V, for example, corresponds to a metering pressure of 400 bar. The correlation between the voltage value of the input signal and the associated metering pressure can in particular be linear, for example an input signal of 1 V corresponds to a metering pressure of 40 bar, an input signal of 2 V corresponds to a metering pressure of 80 bar, etc. The input signal can be determined by the mass flow controller.

Alternatively, the input signal can include an electrical current in the range of, for example, 0 up to and including 20 mA, in particular in the range of 4 up to and including 20 mA inclusive.

Alternatively, a digital control with a discrete signal can be provided, for example via a BUS system.

The mass flow controller contains a processor unit by means of which the associated input signal can be determined from the measured flow value transmitted by the flow sensor.

According to an embodiment, the metering quantity range between the smallest and the largest metering quantity is at least 1:50. In particular, the metering quantity range between the smallest and the largest metering quantity can be at least 1:100. In particular, the metering quantity range between the smallest and the largest metering quantity can be at least 1:500. In particular, the metering quantity range between the smallest and the largest metering quantity can be at least 1:1000.

According to an embodiment, a pre-pressure acting on the upstream side of the pressure control valve is generated by means of a compressor. A compressor is advantageously used when the medium is gaseous. The compressor can be configured as a rotary compressor. According to an embodiment, a pre-pressure acting on the inflow side of the pressure control valve is generated by means of a pump. A pump can be provided for conveying a liquid medium.

According to an embodiment, a first pressure measuring device for measuring the pre-pressure present on the input side of the pressure control valve is formed between the flow sensor and the pressure control valve.

According to an embodiment, a second pressure measuring device for measuring the metering pressure in the feed line is arranged downstream of the pressure control valve.

According to an embodiment, a pre-pressure controller is arranged between the pressure control valve and the discharge opening of the fluid flow of the feed line into the closed channel.

According to an embodiment, a pressure accumulator is arranged upstream of the flow sensor.

According to an embodiment, the controller is configured as a PID controller.

A method for metering a liquid or gaseous medium into a fluid stream flowing through a closed channel wherein the fluid stream has a process pressure comprises the charge of the liquid or gaseous medium into the closed channel by a feed line. A pressure control valve and a flow sensor are arranged in the feed line. The pressure control valve and the flow sensor are arranged in a closed loop control circuit. A measured flow value is generated by the flow sensor, the measured flow value is fed to a controller as an input value, wherein an output value is attributed to the input value by the controller, wherein the output value corresponds to a desired metering pressure. The desired metering pressure is adjusted by the pressure control valve, wherein a metering quantity is determined by the pressure difference between the metering pressure and the process pressure.

In particular, if the metering quantity is changed, a new actual value for the metering quantity is reached within less than 60 seconds.

In particular, the actual value of the metering quantity does not deviate by more than 30% from the setpoint of the metering quantity when the setpoint for the metering pressure is changed.

The system and the method according to one of the preceding embodiments can be used, for example, to control the metering quantity of $CO_2$.

The pressure control valve sets the metering pressure required for metering the exact metering quantity, wherein the resulting metering quantity is obtained from the pressure difference between the metering pressure and the process pressure. At a given process pressure, which is specified, for example, by a fluid stream into which the liquid or gaseous medium to be metered is to be introduced, the metering pressure must always be higher than the process pressure so that the liquid or gaseous medium flows and can enter the fluid stream. The metering quantity depends on the pressure difference between the metering pressure and the process pressure. This relationship can be used for the quantity control: the metering pressure is increased until the required metering quantity is reached. If the measured metering quantity is greater than the target value, the metering pressure is reduced. If the metering quantity is too small, the metering pressure is increased accordingly by means of the pressure control valve. This results in a control of the metering quantity based on pressure control at a given process pressure. If the controller works fast enough, the required metering quantities can be set precisely and in a very wide range. Since the metering pressure is largely insensitive to fluctuations in inlet pressure, e.g., from a compressor, the metering quantity remains constant even if the pressure difference fluctuates. The flow sensor is preferably a mass flow sensor because, in contrast to volumetric flow sensors, it is independent of the temperature of the medium.

It has been shown that with a pressure-controlled system, both very small and very large metering quantities can be metered with the same pressure control valve. Metering quantity ranges of up to 1:1000 can be set reproducibly, i.e., with the assistance of the pressure control, metering quantities of 10 g/h to 10,000 g/h of the liquid or gaseous medium can be added to the fluid flow. The metering quantity can also be set very precisely, and the time elapsed between setting a new metering pressure and reaching the new metering pressure is very short. In addition, no significant overshoot or undershoot can be observed when changing the metering quantity, which can be of major importance for the metering process.

An advantage of the system according to the invention and of the associated method is to be seen in the fact that, when the flow rate increases, the metering quantity effectively conveyed doesn't amount to more than 30% above the set metering quantity. According to an embodiment, when the flow rate increases, metering quantity actually delivered cannot amount to more than 20% above the set metering quantity. According to an embodiment, when the flow rate increases, the metering quantity actually delivered cannot amount to more than 10% above the set metering quantity.

BRIEF DESCRIPTION OF THE DRAWINGS

The system according to the invention is illustrated below with the aid of some exemplary embodiments. It is shown in FIG. 1 a scheme of a first embodiment of a system according to the invention, FIG. 2 a scheme of a second embodiment of a system according to the invention, FIG. 3 an example for a comparison of the target and actual values of the metering quantities for different metering quantities for a system according to FIG. 1 or FIG. 2, FIG. 4 a graphical representation of the dependence of the metering quantity on the pressure difference p1-p2 for a known needle valve, FIG. 5 an example of a comparison of the setpoint and actual values of the metering quantities for different metering quantities for a system according to further embodiments.

DETAILED DESCRIPTION

Figure 1:
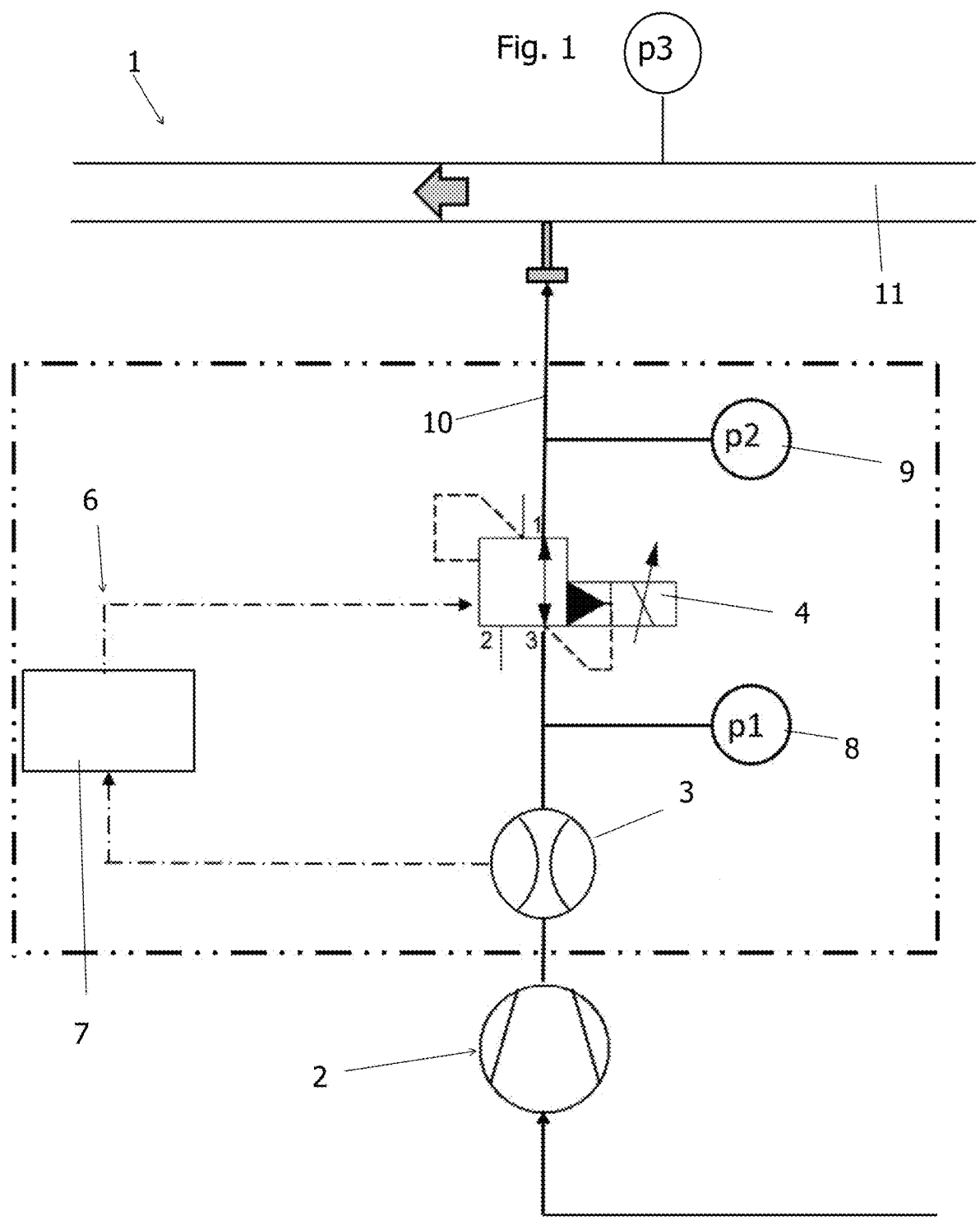

FIG. 1 shows a system 1 for metering a liquid or gaseous medium into a fluid stream flowing through a closed channel 11 which has a process pressure p3. The system comprises a feed line 10 for the liquid or gaseous medium, the feed line 10 being in fluid-conducting connection with the closed channel 11. A pressure control valve 4 and a flow sensor 3 are arranged in the feed line 10, wherein the pressure control valve 4 and the flow sensor 3 are configured as a closed loop control circuit 6. The pressure control valve 4 can for example be configured as an electromagnetic valve. A measured flow value can be determined by means of the flow sensor 3, wherein the measured flow value can be fed into a controller 7 as an input value. This input value can be attributed an output value by the controller 7, wherein the output value corresponds to a desired metering pressure p2. The desired metering pressure p2 can be adjusted by means of the pressure control valve 4, wherein the metering quantity is determined by the pressure difference between the metering pressure p2 and the process pressure p3.

Figure 2:
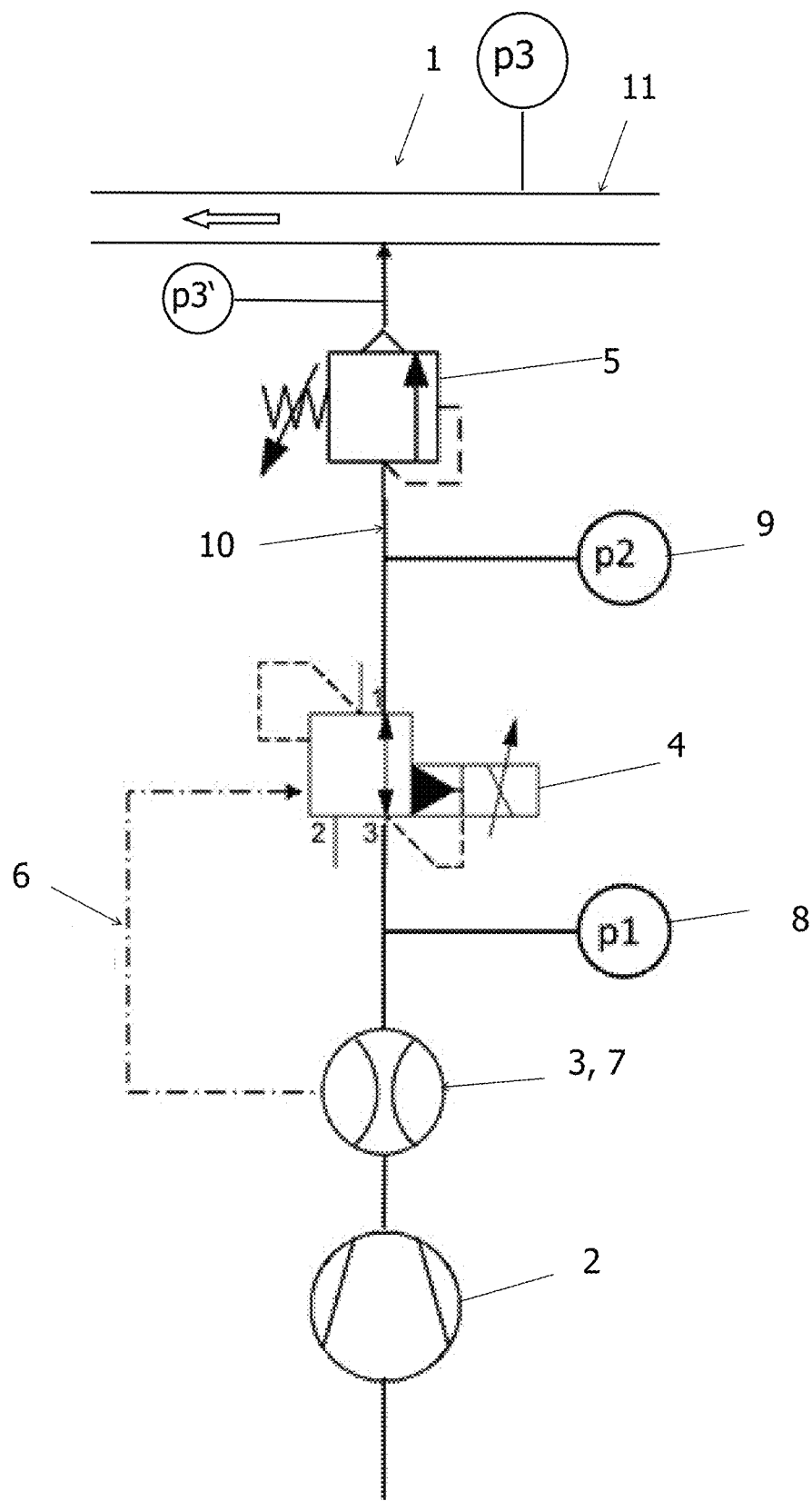

According to an embodiment, the flow sensor 3 is configured as a mass flow sensor and/or the controller 7 is configured as a mass flow controller. In particular, the flow sensor 3 and the controller 7 can form a unit, which is shown in FIG. 2. The controller 7 can be configured, for example, as a PID controller.

The flow sensor 3 is arranged upstream of the pressure control valve 4 in the feed line 10. According to FIG. 1, a first pressure measuring device 8 is arranged between the flow sensor 3 and the pressure control valve 4. This first pressure measuring device 8 detects a pre-pressure p1. The first pressure measuring device 8 is thus configured to measure the pre-pressure p1 present on the inlet side or on the upstream side of the pressure control valve 4. The pre-pressure p1 acting on the upstream side of the pressure control valve 4 can be generated by means of a compressor 2 according to FIG. 1. A sufficiently high pre-pressure p1 is required to enable the gaseous or liquid medium to flow through the feed line 10 in the direction of the fluid flow flowing in the closed channel 11.

A second pressure measuring device 9 for measuring the metering pressure p2 in the feed line 10 can be arranged downstream of the pressure control valve 4, as shown in FIG. 1.

FIG. 2 shows a system 1 for metering a liquid or gaseous medium into a fluid stream flowing through a closed channel 11 according to a second embodiment. Elements that are the same or have the same effect carry the same reference numerals as in FIG. 1, and reference should be made to the description of FIG. 1. The system 1 according to FIG. 2 differs from the system 1 according to FIG. 1 in that the flow sensor 3 and the controller 7 are configured as a single unit. The flow sensor 3 measures the amount of the liquid or gaseous medium which flows from the compressor 2 in the direction of the closed channel 11 through the feed line 10. The closed loop control circuit 6 for controlling the metering quantity comprises the flow sensor 3, the controller 7 and the pressure control valve 4. As in the system according to FIG. 1, the controller 7 determines a setpoint for the metering pressure p2. The setpoint for the metering pressure p2 can be converted into an analog voltage signal, for example. The voltage signal is fed to the pressure control valve 4 via a signal line, which can be part of the closed loop control circuit 6. If the pressure control valve 4 is configured as an electromagnetic valve, the pressure control valve 4 can be adjusted to the metering pressure p2 by means of the voltage signal.

As in the previous exemplary embodiment, the fluid flow flowing in the closed channel 11 has a process pressure p3.

However, if this process pressure p3 is subject to fluctuations, the pressure difference p2-p3 changes, as a result of which the metering quantity changes. If the pressure difference p2-p3 is reduced, a smaller metering quantity is supplied to the fluid flow, if the pressure difference p2-p3 is increased, a correspondingly larger metering quantity is supplied to the fluid flow. A pre-pressure regulator 5 can be provided so that fluctuations in the process pressure p3 do not affect the metering quantity. FIG. 2 shows that the pre-pressure regulator 5 is arranged between the pressure regulating valve 4 and the opening of the feed line 10 in the closed channel 11 of the fluid flow. A simulated process pressure p3 'can be set by means of the pre-pressure regulator 5 so that the metering quantity is determined by the pressure difference p2-p3'.

According to an embodiment not shown, a pressure accumulator is arranged upstream of the flow sensor 3.

Figure 3:
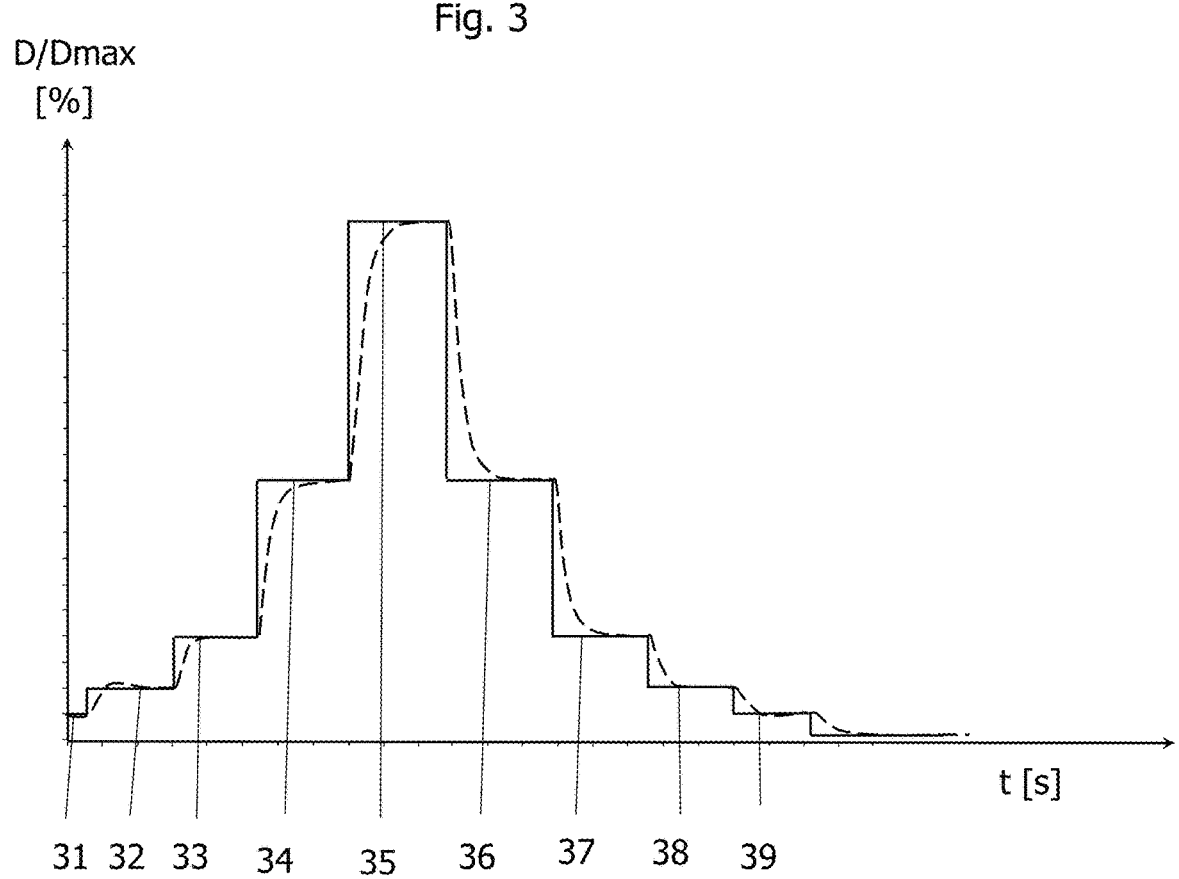

FIG. 3 shows an example of a comparison of the setpoint and actual values of the metering quantities for different metering quantities for a system 1 according to FIG. 1 or FIG. 2, in which the method described below can be carried out. A method for metering a liquid or gaseous medium into a fluid stream flowing through a closed channel 11 and having a process pressure p3 comprises, for example, a system 1 according to one of the embodiments shown in FIG. 1 or FIG. 2. The liquid or gaseous medium is fed into the closed channel 11 by means of a feed line 10. The process pressure p3 is present in the closed channel 11. A pressure control valve 4 and a flow sensor 3 are arranged in the feed line 10 such that a closed loop control circuit 6 is configured by the pressure control valve 4 and the flow sensor 3. A measured flow value is determined by means of the flow sensor 3. The measured flow value is fed into a controller 7 as an input variable, the controller 7 assigns an output value to the input value, the output value corresponding to a desired metering pressure p2. The desired metering pressure p2 is adjusted by the pressure control valve 4, wherein the metering quantity is set by the pressure difference between the metering pressure p2 and the process pressure p3.

When the metering quantity is changed, a new setpoint value for the metering pressure is reached within less than 60 seconds, which is shown in FIG. 3 for an embodiment.

The actual metering quantity does not deviate by more than 30% from the setpoint for the metering quantity if the setpoint for the metering pressure is changed, for example if the setpoint is increased or decreased.

In the example shown in FIG. 3, $CO_2$ is dosed into a fluid stream by means of the method described above. In this example, the pre-pressure p1 is 200 bar, the process pressure p3 is 170 bar. FIG. 3 shows the time course of the set quantity compared to the actual quantity for different metering quantities. The set quantity is shown with a solid line, the actual quantity with a dashed line. The time is thus plotted on the abscissa of the diagram shown in FIG. 3, and the relative metering quantity as a percentage of the maximum possible metering quantity is plotted on the ordinate. The maximum possible metering quantity according to this example corresponds to 2000 g/h or 100%.

The following metering quantities were set in FIG. 3: (31) 100 g/h, (32) 200 g/h, (33) 400 g/h, (34) 1000 g/h, (35) 2000 g/h, (36) 1000 g/h, (37) 400 g/h, (38) 100 g/h, (39) 20 g/h. Each of the metering quantities was set for a period of less than one minute by transmitting a metering pressure p2 corresponding to the respective metering quantity by the controller 7 to the pressure control valve 4 as a voltage signal corresponding to the pressure.

FIG. 3 shows that a deviation of the target quantity from the actual quantity occurs only within a maximum of 30 seconds, after which the target quantity corresponds exactly to the actual quantity. The initial deviation between the target quantity and the actual quantity is essentially the same for large metering quantities as for small metering quantities. The system and the associated process are therefore suitable for both small and large metering quantities. In particular, the system can be used reliably in the case of widely differing metering quantities or metering quantity fluctuations.

Figure 4:
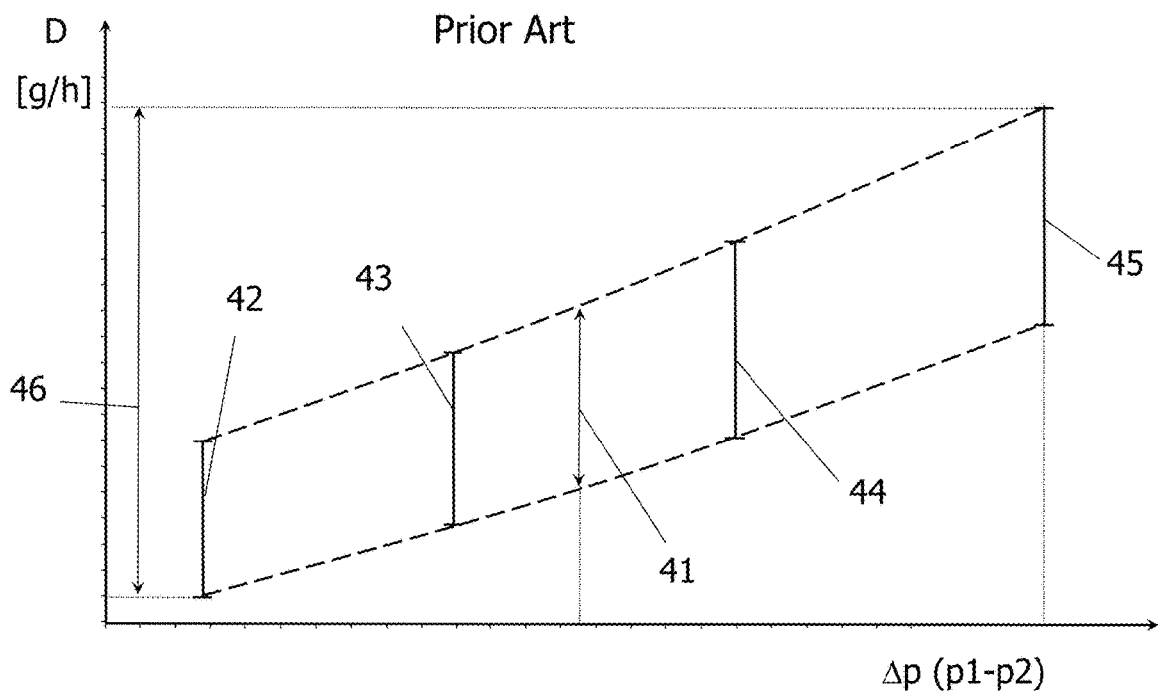

FIG. 4 is a graphical representation of the change of the permissible metering quantity range 41 if the pressure difference $\Delta p$ between the pre-pressure (p1) and the metering pressure (p2) changes for a known needle valve. The metering quantity D is plotted on the ordinate, the pressure difference $\Delta p$ (p1-p2) on the abscissa. If the pressure difference $\Delta p$ (p1-p2) changes, the permissible metering quantity range changes. In FIG. 4, four permissible metering quantity ranges 42, 43, 44, 45 with four different differential pressures $\Delta p1$, $\Delta p2$, $\Delta p3$, $\Delta p4$) are shown as examples. The maximum possible metering quantity range 46 for a needle valve is plotted on the ordinate and results from the difference between the maximum metering quantity and the minimum metering quantity.

For needle valves of this type, the metering quantity is therefore dependent on the pressure difference between the pre-pressure (p1) and the metering pressure (p2) and the needle position. In particular, the position of the permissible metering quantity range depends on the pressure difference between the pre-pressure (p1) and the metering pressure (p2) and the needle position. Since the needle seat allows only a limited range of changes in the needle position due to its design, the permissible metering quantity range that can be achieved at a certain pressure difference is smaller than the maximum metering quantity range. In order to use the maximum metering quantity range 46 of a needle valve, the pressure difference between the pre-pressure (p1) and the metering pressure (p2) has therefore also to be changed in order to shift the permissible metering quantity range 46.

For this reason, fluctuations in the pre-pressure (p1) or the metering pressure (p2) at a constant needle position lead to changes in the metering quantity.

Figure 5:
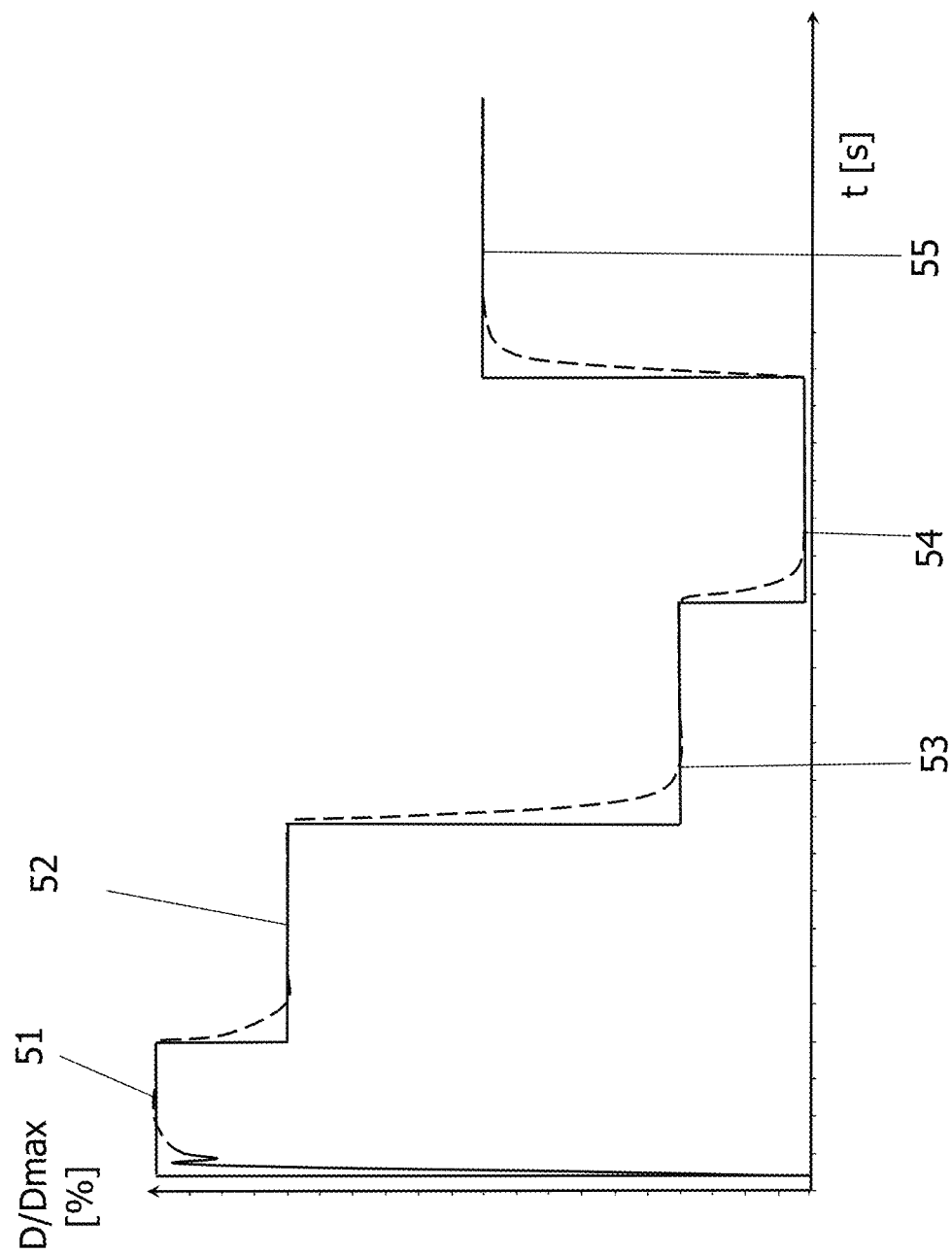

In the example shown in FIG. 5, one of the aforementioned fluids is metered into a fluid stream by means of the method described above. In this example, the pre-pressure p1 is 100 bar, the process pressure p3 is 40 bar. FIG. 5 shows the time course of the target quantity in comparison to the actual quantity for different metering quantities. The target quantity is shown with a solid line, the actual quantity with a dashed line. The time is thus plotted on the abscissa of the diagram shown in FIG. 5, and the relative metering quantity as a percentage of the maximum possible metering quantity is plotted on the ordinate. The maximum possible metering quantity according to this example corresponds to 5000 g/h or 100%.

The following metering amounts were set in FIG. 5: (51) 5000 g/h, (52) 4000 g/h, (53) 1000 g/h, (54) 50 g/h, (55) and 2500 g/h. Each of the metered quantities was set for a period of less than two minutes by a metering pressure p2 corresponding to the respective metering quantity being transmitted from the controller 7 to the pressure control valve 4 as a voltage signal corresponding to the pressure.

Also for this embodiment, FIG. 5 shows that a deviation of the target quantity from the actual quantity occurs only within a maximum of 30 seconds, thereafter the target quantity corresponds exactly to the actual quantity. The initial deviation between the target quantity and the actual quantity is essentially the same for large metering quantities as for small metering quantities. The system and the associated process are therefore suitable for both small and very large metering quantities. Therefore, the system can be used reliably in the case of strongly deviating metering quantities or metering quantity fluctuations.

It is obvious to a person skilled in the art that many further variants are possible in addition to the embodiments described without deviating from the inventive concept. The subject matter of the invention is therefore not restricted by the preceding description and is determined by the scope of protection which is defined by the claims. The broadest possible reading of the claims is authoritative for the interpretation of the claims or the description. In particular, the terms "contain" or "include" are to be interpreted in such a way that they refer to elements, components or steps in a non-exclusive sense, which is intended to indicate that the elements, components or steps can be present or are used that they can be combined with other elements, components or steps that are not explicitly mentioned. When the claims relate to an element or component from a group which may consist of A, B, C to N elements or components, this formulation should be interpreted in such a way that only a single element of that group is required, and not a combination of A and N, B and N, or any other combination of two or more elements or components of this group.

The invention claimed is:

1. A system for determining a metering quantity of a liquid or gaseous medium into a fluid stream which flows through a closed channel and has a sensed process pressure, the system comprising a feed line for the liquid or gaseous medium, wherein the feed line is connected to the closed channel, wherein a pressure control valve and a flow sensor are arranged in the feed line, wherein a closed loop control circuit contains the pressure control valve, the flow sensor and a controller, wherein a measured flow value of the liquid or gaseous medium in the feed line is generated by the flow sensor, wherein the measured flow value is fed to the controller as an input value, wherein an output value is attributed to the input value by the controller, wherein the output value corresponds to a desired metering pressure, wherein a pressure difference between the desired metering pressure and the sensed process pressure is adjusted by the pressure control valve and the metering quantity is determined by the pressure difference between the desired metering pressure and the sensed process pressure.

2. The system of claim 1, wherein the flow sensor is configured as a mass flow sensor.

3. The system of claim 1, wherein the controller is configured as a mass flow controller.

4. The system of claim 1, wherein the flow sensor and the controller form a unit.

5. The system of claim 1, wherein the pressure control valve is configured as an electromagnetic valve.

6. The system of claim 1, wherein a maximum metering quantity is up to and including 50 times greater than a smallest metering quantity.

7. The system of claim 1, wherein a pump is arranged on an upstream side of the pressure control valve to generate a pre-pressure on the upstream side of the pressure control valve.

8. The system of claim 1, wherein a first pressure measuring device is arranged between the flow sensor and the pressure control valve for measuring a pre-pressure on an input side of the pressure control valve.

9. The system of claim 1, wherein a second pressure measuring device for measuring the desired metering pressure in the feed line is arranged downstream of the pressure control valve.

10. The system of claim 1, wherein a pre-pressure controller is arranged between the pressure control valve and a discharge opening of the fluid flow of the feed line into the closed channel.

11. The system of claim 1, wherein a pressure accumulator is arranged upstream of the flow sensor.

12. The system of claim 1, wherein a pressure relief valve is arranged upstream of the flow sensor.

13. The system of claim 1, wherein the controller is configured as a PID controller.

14. A method for determining a metering quantity of a liquid or gaseous medium into a fluid stream flowing through a closed channel, wherein the fluid stream has a sensed process pressure, the method comprising:

dosing the liquid or gaseous medium into a feed line which feeds into the closed channel, wherein the liquid or gaseous medium flows in the feed line, wherein a pressure control valve and a flow sensor are arranged in the feed line, wherein a closed loop control circuit contains the pressure control valve, the flow sensor and a controller, controlling, via the pressure control valve, the flow sensor, and the controller, a metering quantity of the liquid or gaseous medium in the feed line, wherein generating, via the flow sensor, a measured flow value, wherein the controller receives the measured flow value as an input value, wherein the controller attributes an output value to the input value, wherein the output value corresponds to a desired metering pressure, adjusting, via the pressure control valve a pressure difference between the desired metering pressure and the sensed process pressure, such that the metering quantity of the liquid or gaseous medium is determined by the pressure difference between the desired metering pressure and the sensed process pressure.

15. The method of claim 14, wherein a new actual value for the metering quantity is obtained within less than 60 seconds when the metering quantity is changed.

16. The method of claim 14, wherein an actual value of the metering quantity does not differ by more than 30% from a setpoint of the metering quantity if the setpoint for the desired metering pressure is changed.

17. The method of claim 14, wherein the liquid or gaseous medium comprises carbon dioxide.

18. The system of claim 1, wherein the flow sensor is arranged upstream of the pressure control valve in the feed line.

* * * * *